United States Patent [19]

Murai

[11] Patent Number: 4,839,946
[45] Date of Patent: Jun. 20, 1989

[54] CORD LOCK
[75] Inventor: Ryukichi Murai, Toyama, Japan
[73] Assignee: Yoshida Kogyo K. K., Tokyo, Japan
[21] Appl. No.: 188,484
[22] Filed: Apr. 29, 1988
[30] Foreign Application Priority Data May 1, 1987 [JP] Japan .............................. 62-66288[U]

[51] Int. Cl.⁴ ............................................ F16G 11/04
[52] U.S. Cl. ................. 24/115 G; 24/136 R
[58] Field of Search ................. 24/115 G, 136 R, 297, 24/616, 557; 411/48, 60

[56] References Cited

U.S. PATENT DOCUMENTS

| | | | |
|---|---|---|---|
| 2,379,676 | 7/1945 | Blackstone | 24/115 G |
| 2,524,649 | 10/1950 | Buhler | 24/115 G |
| 4,118,838 | 10/1978 | Schiefer et al. | 24/115 G |
| 4,188,686 | 2/1980 | Baum | 24/115 G |
| 4,328,605 | 5/1982 | Hutchison et al. | 24/115 G |
| 4,453,292 | 6/1984 | Bakker | 24/115 G |
| 4,622,723 | 11/1986 | Krauss | 24/115 G |
| 4,675,948 | 6/1987 | Bengtsson | 24/115 G |
| 4,724,584 | 2/1988 | Kasai | 24/115 G |

FOREIGN PATENT DOCUMENTS

| | | |
|---|---|---|
| 0174498 | 3/1986 | European Pat. Off. . |
| 0228656 | 7/1987 | European Pat. Off. . |
| 59-78475 | 5/1984 | Japan . |
| 2131868 | 6/1984 | United Kingdom . |
| 2178790 | 2/1987 | United Kingdom . |

Primary Examiner—Victor N. Sakran
Attorney, Agent, or Firm—Hill, Van Santen, Steadman & Simpson

[57] ABSTRACT

A cord lock is composed of only two component parts, namely a one-piece socket molded of synthetic resin and having a pair of resilient flaps, and a one-piece plug molded of synthetic resin and having a wedge-shaped end portion engageable with the resilient flaps and coacting with the latter for urging the plug axially upwardly under the resiliency of the resilient flaps.

14 Claims, 5 Drawing Sheets

CORD LOCK

BACKGROUND OF THE INVENTION

1. Field of the Invention

This invention relates to a cord lock for adjustably fastening or stopping a cord or string attached to a tent, a rucksack, an anorack or other various articles.

2. Description of the Prior Art

One prior cord lock disclosed in Japanese Patent Laid-open Publication No. 59-78475 includes, as reillustrated here in FIG. 16 of the accompanying drawings, a cylinder B having diametrically opposed apertures A, A for receiving a cord, a piston D movably fitted in the cylinder B and having a transverse bore C alignable with the apertures A, A when the cord is threaded through the apertures A, A and the bore C, and a compression coil spring E disposed in the cylinder B and acting between the cylinder B and the piston D for urging the latter in a direction to lock the cord in position against displacement with respect to the cord lock.

The disclosed cord lock is composed of three separate component parts and hence is complicated in assembly. Particularly, a tedious and time-consuming adjustment is necessary when the compression coil spring E is disposed concentrically in the cylinder B. Another drawback is that since the spring E is made of metal, there is a tendency toward corrosion and eventually inoperativeness of the cord lock as a whole.

SUMMARY OF THE INVENTION

With the foregoing drawbacks in view, it is an object of the present invention to provide a cord lock which is composed of only two component parts both molded of synthetic resin and hence is easy to assemble and free from corrosion.

According to the present invention, the foregoing and other objects are attained by a cord lock comprising: a one-piece socket molded of synthetic resin and having a pair of aligned lateral apertures for receiving a cord and at least one resilient flap disposed in an axial hole in said socket below said apertures; and a one-piece plug molded of synthetic resin and axially movable in said socket, said plug having a transverse through-hole alignable with said lateral apertures for movement of the cord therethrough, and a wedge-shaped end portion engageable with said resilient flap and coacting with the latter for urging said plug to move axially upwardly under the resiliency of said resilient flap.

The cord lock of the foregoing construction is composed of only two component parts, namely the socket and the plug and hence is simple in construction and easy to assemble. Since both the socket and the plug are molded of synthetic resin, the cord lock is free from corrosion.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

Figure 1:
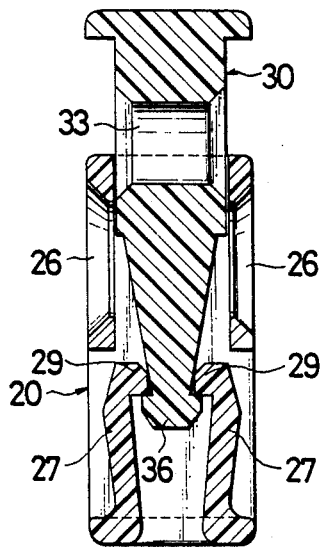
FIG. 1 is a longitudinal cross-sectional view of a cord lock embodying the present invention, showing parts in unlocking position.
Figure 2:
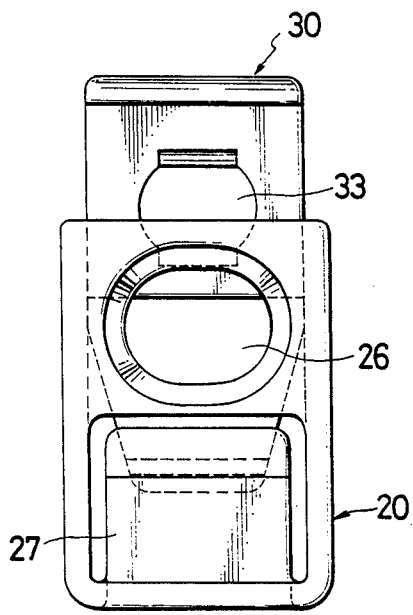
FIG. 2 is a front elevational view of the cord lock.
Figure 3:
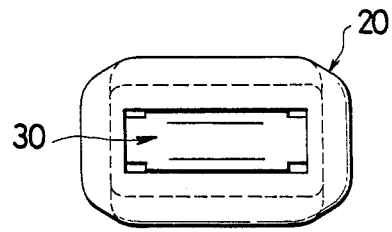
FIG. 3 is a bottom view of the cord lock.

Referring now to the drawings wherein like reference characters designate like or corresponding parts throughout several views, there is illustrated in FIG. 1, a cord lock embodying the present invention. The cord lock is composed of two parts, namely a socket 20 and a plug 30, both molded of a synthetic resin material such as an acetal resin.

Figure 7:
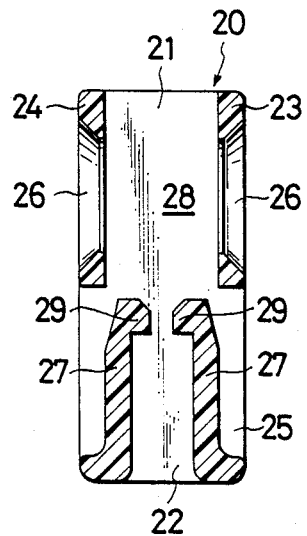
FIG. 7 is a longitudinal cross-sectional view of a socket constituting one part of the cord lock shown in FIG. 1.
Figure 8:
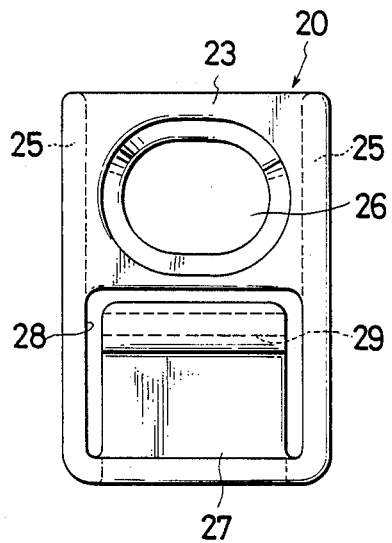
FIG. 8 is a front elevational view of the socket.

The socket 20, as shown in FIGS. 7 and 8, is in the shape of a rectangular hollow box opening at its opposite ends 21, 22 and composed of front and back plates 23, 24 connected together by opposed side plates 25. The box-shaped socket 20 has a pair of aligned lateral apertures 26 defined centrally in the front and back plates 23, 24, respectively, and disposed adjacent to one or the upper end 21 of the socket 20 for receiving a cord (not shown) to be locked on the cord lock. The apertures 26 have an oblong shape so as to receive opposite ends of a cord (or two identical cords) concurrently. Outer ends of the oblong apertures 26 are beveled or countersunk for easy receipt of the cords.

The box-shaped socket 20 further has two opposed resilient flaps 27, 27 disposed in axial interior space 28 in the socket 20 below the apertures 26. The resilient flaps 27 lie in two planes disposed inwardly of and extending parallel to the front and back plates 23, 24 of the socket 20. The flaps 27 extend integrally from the lower end 22 toward the upper end 21 of the socket 20 and terminate short of the lower ends of the front and back plates 23, 24, respectively. Each of the resilient flaps 27 has a locking prong 29 projecting laterally inwardly from the distal end thereof toward the locking prong 29 on the distal end of the opposite resilient flap 27 for a purpose described below.

Figure 9:
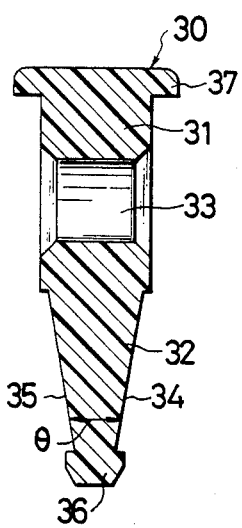
FIG. 9 is a longitudinal cross-sectional view of a plug constituting the other part of the cord lock shown in FIG. 1.
Figure 10:
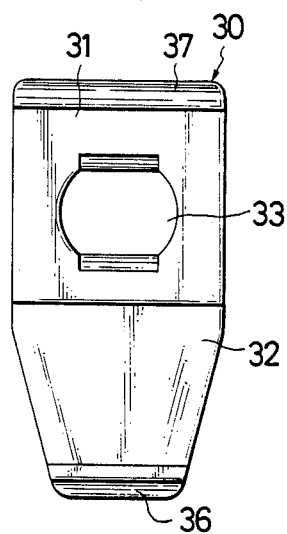
FIG. 10 is a front elevational view of FIG. 9.

The plug 30, as shown in FIGS. 9 and 10, has a generally rectangular body movably receivable in the axial interior space 28 in the socket 20. The plug 30 includes a substantially square head 31 of a uniform thickness and a wedge-shaped lower end portion 32 extending from a lower end of the head 31. The head 31 has a transverse through-hole 33 alignable with the lateral apertures 26 in the socket 20 for movement of the cords therethrough. The through-hole 33 has a generally oblong shape for receipt of the two cords and is beveled at opposite ends thereof along upper end lower edges for easy receipt of the cords. The wedge-shaped lower end portion 32 has sloped front and back surfaces 34, 35 tapering or converging downwardly at an acute angle $\theta$ not less than 20 degrees and terminating in an enlarged locking foot 36. The locking foot 36 is lockingly engageable with the locking prongs 29 to couple the plug 30 with the socket 20 when they are assembled together.

To assemble the socket 20 and the plug 30 together, the plug 30 is inserted into the axial interior space 28 in the socket 20 with the wedge-shaped lower end portion 32 directed forwardly. As the plug 30 is moved axially downwardly, the enlarged locking foot 36 rest on and between the locking prongs 27. A further downward movement of the plug 30 causes the resilient flaps 27 to be flexed laterally outwardly until the enlarged locking foot 36 moves past the locking prongs 29 whereupon the resilient flaps 27 spring back inwardly, thereby bringing the locking prongs 29 into interlocking engagement with the locking foot 36. Thus, the socket 20 and the plug 30 are coupled together against removal, as shown in FIG. 1. In this assembled condition, the resilient flaps 27 exert lateral forces or pressures on the wedge-shaped lower end portion 32. Due to the particular wedge shape of the lower end portion 32, the lateral forces are then partly converted to an axial force or thrust acting on the plug 30 to urge the same upwardly until the locking foot 36 abuts on the locking prongs 29.

Figure 4:
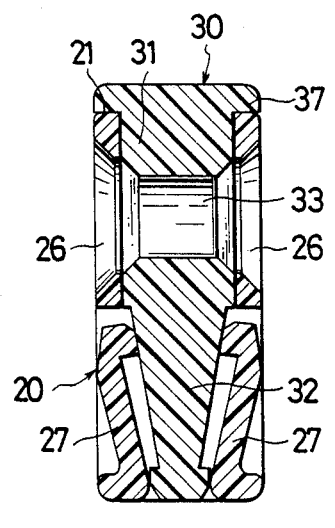
FIG. 4 is a view similar to FIG. 1, showing parts in locking position.
Figure 5:
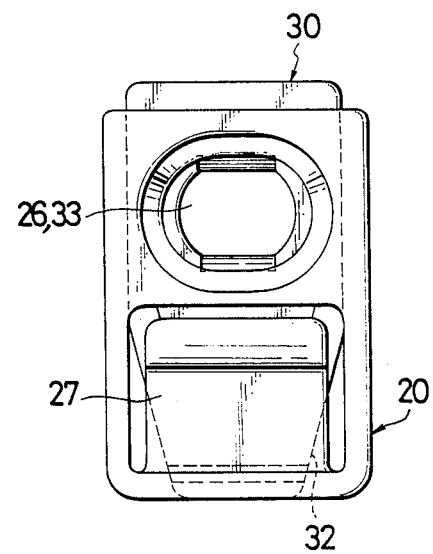
FIG. 5 is a front elevational view of FIG. 4.
Figure 6:
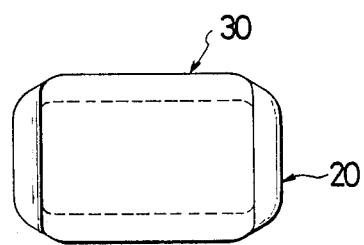
FIG. 6 is a top view of FIG. 5.

In use, the socket 20 is gripped by the user's fingers and the plug 30 is displaced downwardly against the resiliency of the flaps 27 until the upper flange 37 of the head 31 abuts against the upper end 21 of the socket 20, as shown in FIG. 4. At this time, the through-hole 33 in the plug 30 and the apertures 26 in the socket 20 extend in coaxial alignment with one another. While keeping this condition, opposite end portions of a cord (or two identical cords) are threaded successively through one of the apertures 26, the through-hole 33 and the other aperture 26. When released from the downward pressure, the plug 30 is moved upwardly as the wedge-shaped end portion 32 is urged by the resilient forces stored in the outwardly flexed flaps 27 to slide upwardly along the locking prongs 29 of the respective flaps 27. The cord portions are therefore gripped firmly by and between the socket 20 and the plug 30 against accidental displacement.

When the length or position of the cord is to be adjusted while the cord lock is in use, the plug 30 is displaced downwardly against the resiliency of the flaps 27 until the through-hole 33 and the apertures 26 are brought into coaxial alignment with one another. The cord portions can now be adjusted to change its position or the length of the cord, thereby varying the degree to which the cord is fastened by the cord lock.

Figure 11:
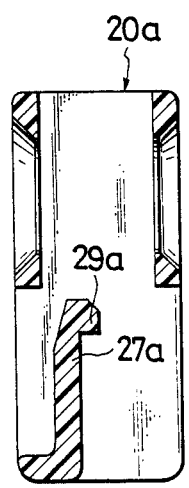
FIG. 11 is a longitudinal cross-sectional view of a modified socket.
Figure 12:
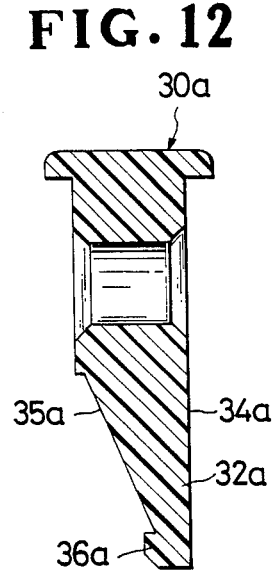
FIG. 12 is a longitudinal cross-sectional view of a plug for use with the socket of FIG. 11.

A modified socket 20a shown in FIG. 11 is substantially identical with the socket 20 of the foregoing embodiment with the exception that only one resilient flap 27a is disposed in the interior space of the socket 20a. The resilient flap 27a has on its distal end a lateral locking prong 29a. FIG. 12 shows a modified plug 30a which is so constructed as to be assembled with the socket 20a of FIG. 11. The plug 30a includes a wedge-shaped lower end portion 32a having a flat front surface 34a and a sloped back surface 35a which jointly form an acute angle not less than 20 degrees. In assembly, the plug 30a is inserted into the socket 20a with the wedge-shaped lower end portion 32a directed forwardly until an enlarged locking foot 36a on the lower end portion 32a is snapped with the locking prong 29a of the resilient flap 27a. In this assembled condition, the plug 30a is urged upwardly under the resilient force applied by the flap 27a to the sloped back surface 35a of the wedge-shaped lower end portion 32a.

Figure 13:
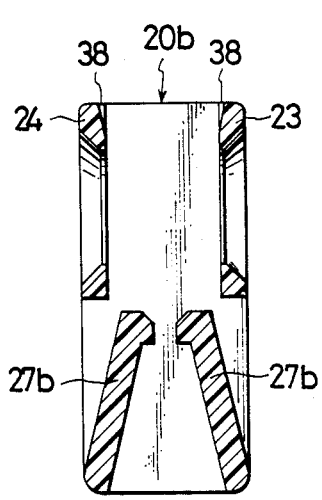
FIG. 13 is a longitudinal cross-sectional view showing a modified form of the socket.
Figure 14:
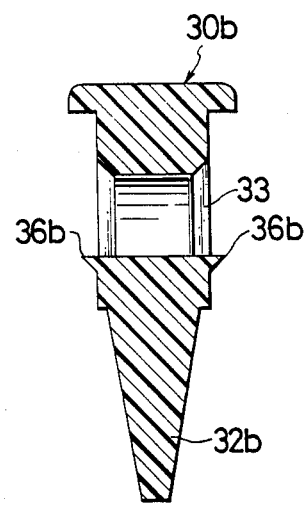
FIG. 14 is a longitudinal cross-sectional view of a plug adapted to be assembled with the socket shown in FIG. 13.

FIG. 13 shows a modified form of socket 20b which is assembled with a plug 30b shown in FIG. 14. The socket 30b has a pair of confronting axial grooves 38 extending in the front and back plates 23, 24 of the socket 20b for guiding a pair of lateral locking projections 36b on the plug 30b. The locking projections 36b are disposed immediately below a transverse through-hole 33 in the plug 30b and lockingly engageable with the lower end edges of the front and back plates 23, 24, respectively, to couple the socket 20b and the plug 30b together. The socket 20b includes a pair of resilient flaps 27b converging upwardly toward each other. The resilient flaps 27b thus inclined have resilient forces which are greater than the resilient forces of the flaps 27 shown in FIG. 7 and hence tend to lift the plug 30b more strongly than as done in the embodiment shown in FIG. 1.

Figure 15:
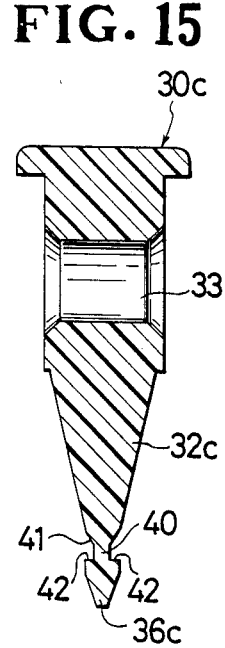
FIG. 15 is a longitudinal cross-sectional view of a modified plug.
Figure 16:
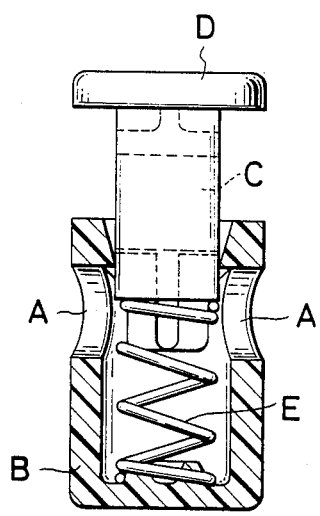
FIG. 16 is a longitudinal cross-sectional view of a conventional cord lock.

A modified plug 30c shown in FIG. 15 is substantially the same as the plug 30 shown in FIG. 9 excepting that a wedge-shaped lower end portion 32c is recessed on its opposite sides so as to form a vertical narrow neck 40 extending between an enlarged locking foot 36c and a camming section 41. The locking foot 36c has a pair of lateral shoulders 42 extending perpendicularly from the lower end of the neck 40. With the shoulders 42 and the neck 40 thus provided, the locking foot 36c can be stably and firmly locked with the locking prongs (identical to the locking prongs 29 of the socket 20 shown in FIG. 7) when the plug 30c is assembled with the socket 20. The camming section 41 extends upwardly divergently from the upper end of the neck 40 at an angle of 60 degrees (i.e. at an angle greater than the tapering angle of the wedge-shaped end portion 32c accord) and blends into the wedge-shaped end portion 32c which extends convergently at an angle of 25 degrees. The camming section 41 serves to ensure that the locking foot 36c is brought into and out of smooth locking engagement with the locking prongs 29 of the socket 20 when the plug 30c is axially moved under and against the resiliency of the flaps 27.

Obviously, various modifications and variations of the present invention are possible in the light of the above teaching. It is therefore to be understood that within the scope of the appended claims the invention may be practiced otherwise than as specifically described.

What is claimed is:

1. A cord lock comprising:
   (a) a one-piece socket molded of synthetic resin and having a pair of aligned lateral apertures for receiving a cord and at least one resilient flap disposed in an axial hole in said socket below said apertures; and
   (b) a one-piece plug molded on synthetic resin and axially movable in said socket, said plug having a transverse through-hole alignable with said lateral apertures for movement of the cord therethrough, and a wedge-shaped end portion engageable with said resilient flap and coacting with the latter for urging said plug to move axially upwardly under the resiliency of said resilient flap.

2. A cord lock according to claim 1, said wedge-shaped end portion having a flat front surface and a sloped back surface, said resilient flap having a locking prong frictionally engageable with said sloped back surface.

3. A cord lock according to claim 1, said wedge-shaped end portion having sloped front and back surfaces, the number of said resilient flap being two, said two resilient flaps having, on their distal ends, locking prongs projecting laterally inwardly toward each other and frictionally engageable with said front and back surfaces of said wedge-shaped end portion.

4. A cord lock according to claim 3, said resilient flaps extending parallel to one another.

5. A cord lock according to claim 3, said resilient flaps extending upwardly convergently toward each other.

6. A cord lock according to claim 1, said wedge-shaped end portion tapering at an acute angle ($\theta$) not less than 20 degrees.

7. A cord lock according to claim 6, said wedge-shaped end portion tapering at an angle of 25 degrees.

8. A cord lock according to claim 1, said plug having a locking projection lockingly engageable with a locking portion of said socket to couple said socket and said plug.

9. A cord lock according to claim 8, said locking projection comprising an enlarged foot integral with a distal end of said wedge-shaped end portion, said locking portion of said socket comprising a locking prong integral with a distal end of said resilient flap.

10. A cord lock according to claim 9, said enlarged foot having a pair of lateral shoulders facing upwardly said wedge-shaped end portion further having a narrow neck extending perpendicularly upwardly from inner ends of said shoulders, and a camming section extending divergently upwardly from an upper end of said neck and blending into said wedge-shaped end portion accord, said camming section tapering at an angle larger than the tapering angle of said wedge-shaped end portion.

11. A cord lock according to claim 10, said wedge-shaped end portion tapering at an angle of 25 degrees, said camming portion tapering at an angle of 60 degrees.

12. A cord lock according to claim 8, said socket having a pair of opposed plates in which said lateral apertures are formed respectively, said locking projection being disposed immediately below said through-hole and lockingly engageable with a lower end of one of said opposed plates.

13. A cord lock according to claim 12, said one plate having an axial groove facing an interior space in said socket for guiding said locking projection.

14. A cord lock according to claim 1, said socket having a rectangular hollow box with opposite ends open and including a front and back plates, said resilient flap being disposed on the same side as one of said front and back plates.

* * * * *